United States Patent
Uchida et al.

Patent Number: 5,291,515
Date of Patent: * Mar. 1, 1994

[54] SPREAD SPECTRUM COMMUNICATION DEVICE

[75] Inventors: Yoshitaka Uchida; Mamoru Endo; Masahiro Hamatsu; Shigeo Akazawa, all of Tokyo, Japan

[73] Assignee: Clarion Co., Ltd., Tokyo, Japan

[*] Notice: The portion of the term of this patent subsequent to Jul. 13, 2010 has been disclaimed.

[21] Appl. No.: 713,462

[22] Filed: Jun. 11, 1991

[30] Foreign Application Priority Data

Jun. 14, 1990 [JP] Japan .................................. 2-153998
Jan. 31, 1991 [JP] Japan .................................. 3-31631

[51] Int. Cl.⁵ .......................................... H04L 27/30
[52] U.S. Cl. .......................................... 375/1; 380/33; 380/34; 370/18
[58] Field of Search .................. 375/1; 380/33, 34, 35, 380/31, 41; 370/18

[56] References Cited

U.S. PATENT DOCUMENTS

| | | | |
|---|---|---|---|
| 4,037,159 | 7/1977 | Martin | 375/1 |
| 4,225,935 | 9/1980 | Zscheile, Jr. et al. | 375/1 X |
| 4,730,340 | 3/1988 | Frazier, Jr. | 375/1 |
| 5,081,643 | 1/1992 | Schilling | 375/1 |
| 5,093,839 | 3/1992 | Kohno et al. | 375/1 |

Primary Examiner—Bernarr E. Gregory
Attorney, Agent, or Firm—Flynn, Thiel, Boutell & Tanis

[57] ABSTRACT

On the transmitter side, data to be transmitted are converted into a plurality of parallel data sets by a serial-parallel converter 101 and spread spectrum modulation is effected by means of PN code generators 105 and selectors 102. Each of the modulated outputs is delayed by a delaying circuit 103 with reference to a sounder channel and the phase thereof. The output thus delayed and the output of the sounder channel are added by an adder 104 to be multiplexed and transmitted.

On the receiver side, correlation between a received signal and a reference signal is formed by a correlator 201 to obtain a correlation pulse from the correlation output thus obtained. Data demodulation is effected by means of a sounder detecting circuit 209, a sampling pulse generating circuit 210 and an information detecting circuit 211, starting from this correlation pulse.

According to the structure described above, in SS communication, data demodulation can be effected with a high efficiency by using a single correlator.

15 Claims, 12 Drawing Sheets

FIG. 3a
TRANSMITTED DATA

FIG. 3b
CSK SYSTEM

FIG. 3c
OOK SYSTEM

SPREAD SPECTRUM COMMUNICATION DEVICE

FIELD OF THE INVENTION

The present invention relates to a spread spectrum communication device, and in particular to an improvement of a spread spectrum communication device for making data demodulation using a single correlator possible.

BACKGROUND OF THE INVENTION

Figure 6:
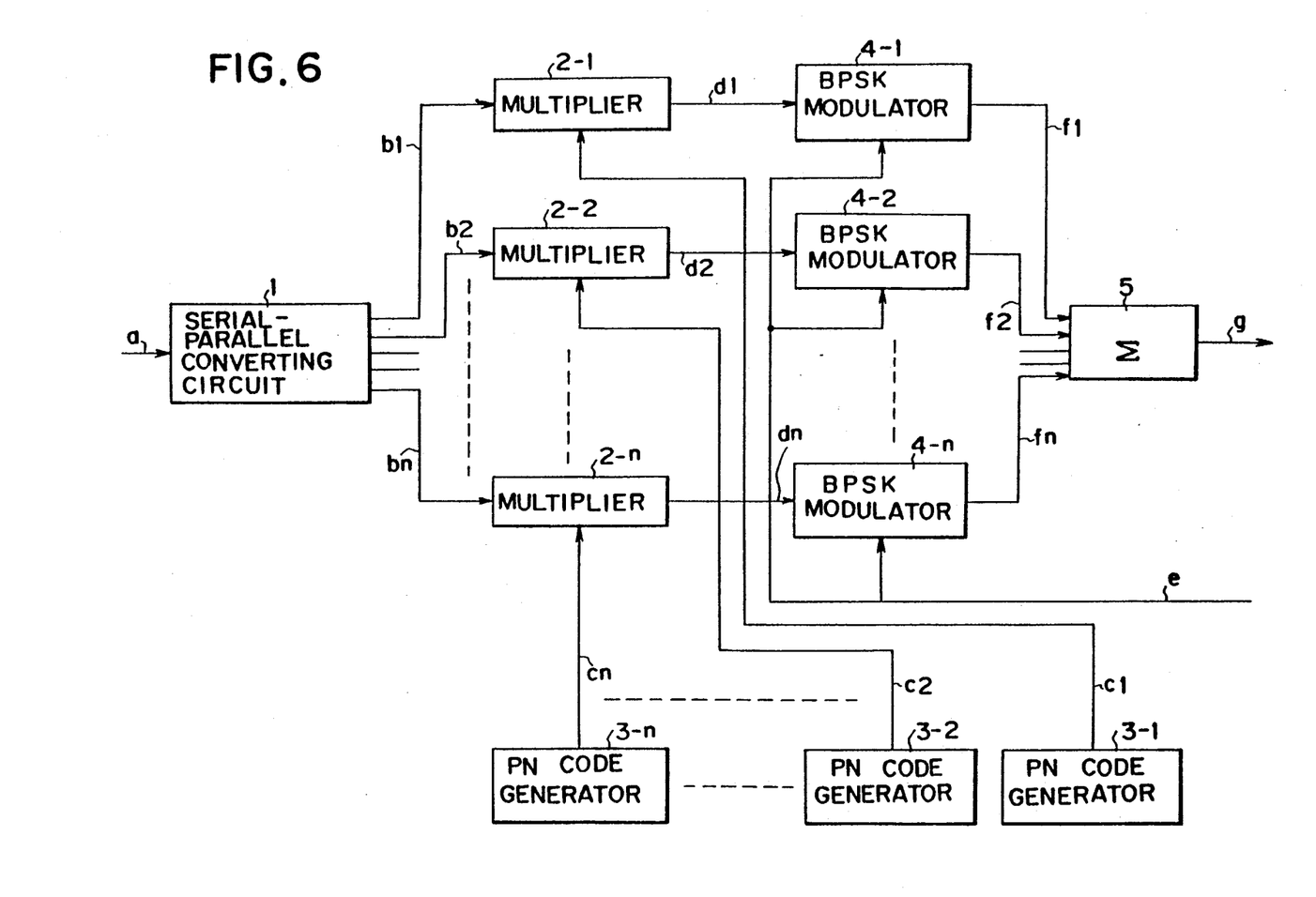
FIG. 6 is a block diagram showing an example of the transmitter of the prior art device.
Figure 7:
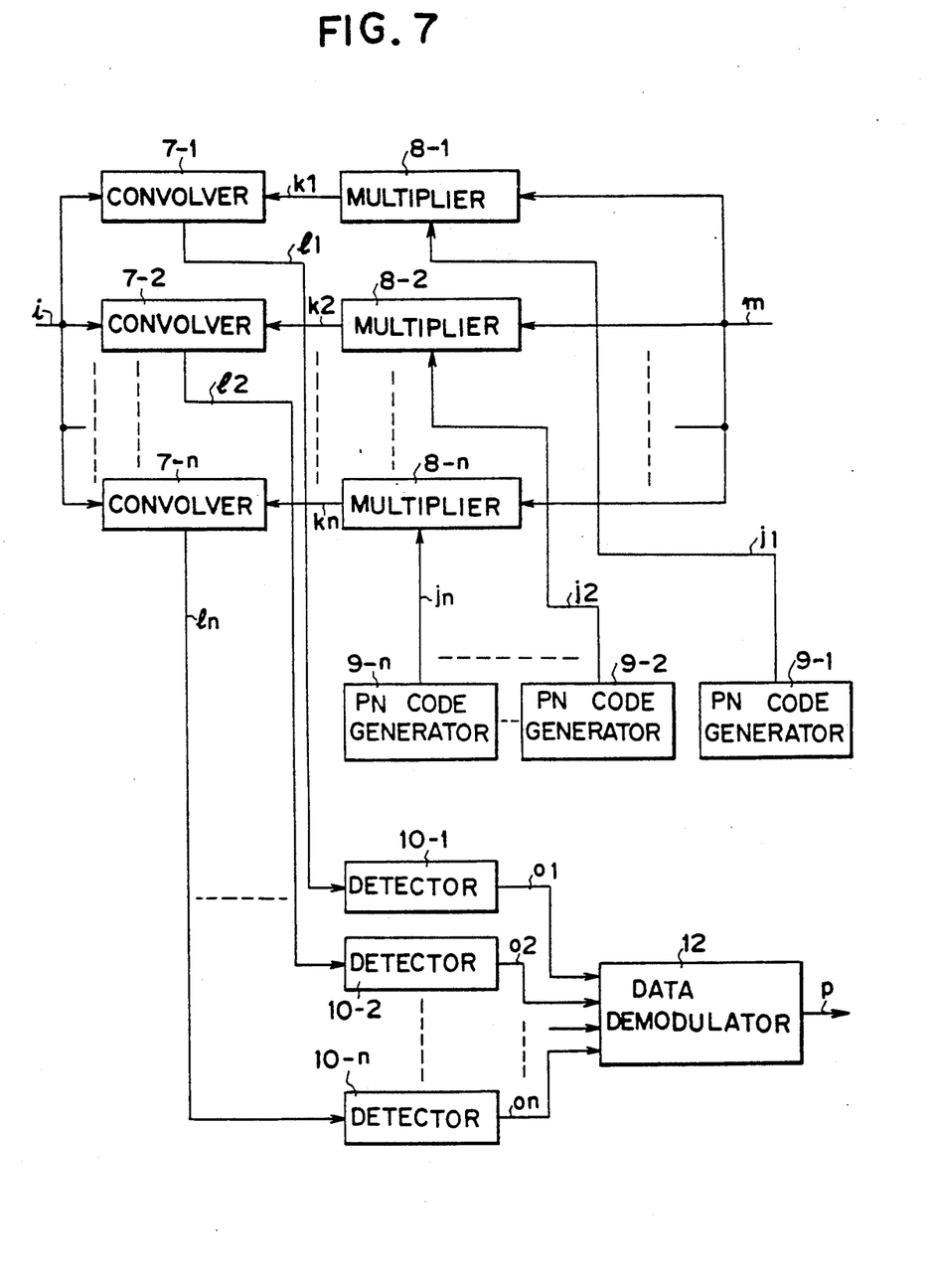
FIG. 7 is a block diagram showing an example of the receiver of the prior art device.

FIGS. 6 and 7 show an example of the multiplex communication device by a prior art spread spectrum communication system executing high speed data communication.

FIG. 6 indicates the construction of a transmitter, in which reference numeral 1 is a serial-parallel converting device; 2-1 ∼ 2-$n$ are multiplies; 3-1 ∼ 3-$n$ are PN code generators; 4-1 ∼ 4-$n$ are BPSK modulators; and 5 is an adder.

In the transmitter described above, inputted high sped data $a_1$ are converted into parallel data $b_1$, $b_2$, ... , $b_n$ by the serial-parallel converting device 1. Each of the parallel data sets $b_1$, $b_2$, ... , $b_n$ is inputted in one input of each of the multipliers 2-1, 2-2, ... , 2-$n$. On the other hand, each of PN codes $c_1$, $c_2$, ... , $c_n$ different from each other outputted by each of the PN code generators 3-1, 3-2, ... , 3-$n$ is inputted in the other input of each of the multipliers 2-1, 2-2, ... , 2-$n$. Outputs $d_1$, $d_2$, ... , $d_n$ of the multipliers 2-1, 2-2, ... , 2-$n$ are inputted in the BPSK modulators 4-1, 4-2, ... , 4-$n$, respectively, to modulate an RF carrier signal $e_5$. In this way, RF signals $f_1$, $f_2$, ... , $f_n$ are outputted by the BPSK modulators 4-1, 4-2, ... , 4-$n$, respectively, which RF signals are inputted in the adder 5. An n-multiplexed spread spectrum signal g is outputted by the adder 5 to be transmitted.

FIG. 7 indicates the construction of the receiver, in which 7-1 ∼ 7-$n$ are convolvers; 8-1 ∼ 8-$n$ are multipliers; 9-1 ∼ 9-$n$ are PN code generators; 10-1 ∼ 10-$n$ are detectors; and 12 is a data demodulator.

In the receiver described above, a received signal i is divided into a plurality of signals, each of which is inputted in one input of each of the convolvers 7-1, 7-2, ... , 7-$n$.

On the other hand, the PN code $j_1$, $j_2$, ... $j_n$ outputted by each of the PN code generator 9-1, 9-2, ... 9-$n$ is applied to one input of each of the multipliers 8-1, 8-2, ... , 8-$n$. An RF carrier signal m is inputted in the other inputs of the multipliers 8-1, 8-2, ... , 8-$n$. The output $k_1$, $k_2$, ... , $k_n$ of each of the multipliers 8-1, 8-2, ... , 8-$n$ is applied to the other input of each of the convolvers 7-1, 7-2, ... , 7-$n$.

The output $l_1$, $l_2$, ... , $l_n$ of the convolvers are inputted in the detectors 10-1, 10-2, ... , 10-$n$, respectively. At this time, in the outputs of the convolvers correlation spikes are produced with a same timing for different data channels. The outputs $o_1$, $o_2$, ... , $o_n$ of the detectors 10-1, 10-2, ... , 10-$n$ are inputted in the data demodulator 12. Demodulated data p are outputted by the data demodulator 12.

The prior art multiplex communication device described above has drawbacks that it is necessary to synchronize the carriers and that a plurality of convolvers (or matched filters) serving as correlators are required.

OBJECT OF THE INVENTION

Therefore, the object of the present invention is to remove the drawback of the prior art multiplex communication device that a plurality of correlators are required for the prior art communication device and to provide a multiplex communication device, in which demodulation is effected by means of a single correlator.

In order to achieve the above object, a spread spectrum communication device according to a first invention of the present application is characterized in that it comprises a transmitter having a serial-parallel converting means for converting serial data to be transmitted into a plurality of parallel data sets, spread spectrum modulating means for effecting spread spectrum modulation by using the plurality of parallel data sets, delaying means for delaying each of outputs of the spread spectrum modulating means with reference to a spread spectrum modulation signal, which doesn't depend on the plurality of parallel data sets, and the phase of the spread spectrum modulation signal, adding means for adding the output of each of the delaying means to the spread spectrum modulation signal, and an RF modulator for RF modulating the output of the adding means; and a receiver having a correlator for correlating a received signal with a reference signal, converting means for converting an output signal of the correlator into a signal in a base band information band, a binary converting circuit for converting the output of the converting means into a digital signal, and data demodulating means for demodulating the digital signal to restore the data.

A spread spectrum communication device according to a second invention of the present application is characterized in that it comprises a transmitter having a serial-parallel converting means for converting serial data to be transmitted into a plurality of parallel data sets, spread spectrum modulating means for spread-spectrum-modulating the plurality of parallel data sets, and means for outputting multiplexed spread spectrum modulation signal combining a spread spectrum modulation signal with a spread spectrum modulation signal, which doesn't depend on the plurality of parallel data sets; and a receiver having a correlator for correlating a received signal with a reference signal, means for generating a correlation pulse by converting an output signal of the correlator into a signal in a base band information band and further converting it into a binary value, detecting means for detecting a correlation pulse component corresponding to a spread spectrum modulation signal, which doesn't depend on the data to be transmitted, from the correlation pulse and means for restoring the data from the correlation pulse on the basis of the correlation pulse component.

In the multiplexed communication device constructed as described above, the transmitter side transmits the reference signal (in which the PN code is not modulated with data, i.e. which doesn't depend on the data, e.g. is in the state where "all the bits are 1", called sounder) and the information signal (data), combined with each other. On the transmitter side inputted high speed data are serial-parallel-converted and spread-spectrum-modulated for every channel. These modulated signals are delayed successively for every channel with reference to the phase of the spread spectrum modulation signal, which doesn't depend on the data, i.e. the sounder, and the spread spectrum modulation signal, which is the sounder, and each of the delayed signal are combined and multiplied by an RF carrier signal to be transmitted.

On the receiver side, correlation between the reference signal and the received signal is formed by means of a single correlator. The PN code used as the reference signal for the correlator is so selected that a correlation spike is produced, e.g. when the data are "1". Differing from the prior art system, in the output of the correlator, e.g. a correlation spike due to the sounder is outputted at the heading and subsequently correlation spikes of the delayed data channels are outputted one after another is serial.

DETAILED DESCRIPTION

Figure 1A:
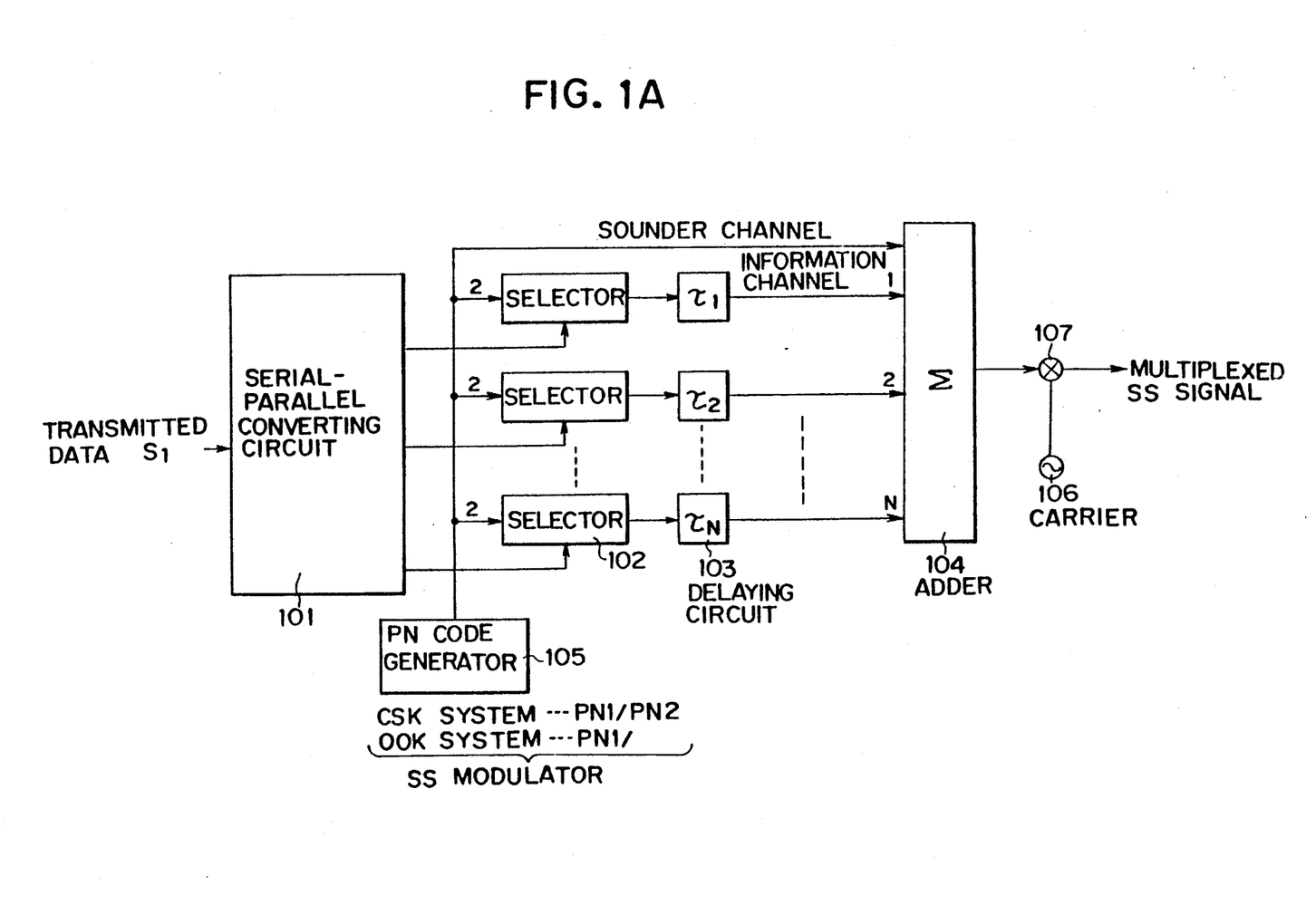
FIG. 1A is a block diagram showing an embodiment of the transmitter of the spread spectrum communication device according to the present invention.
Figure 1B:
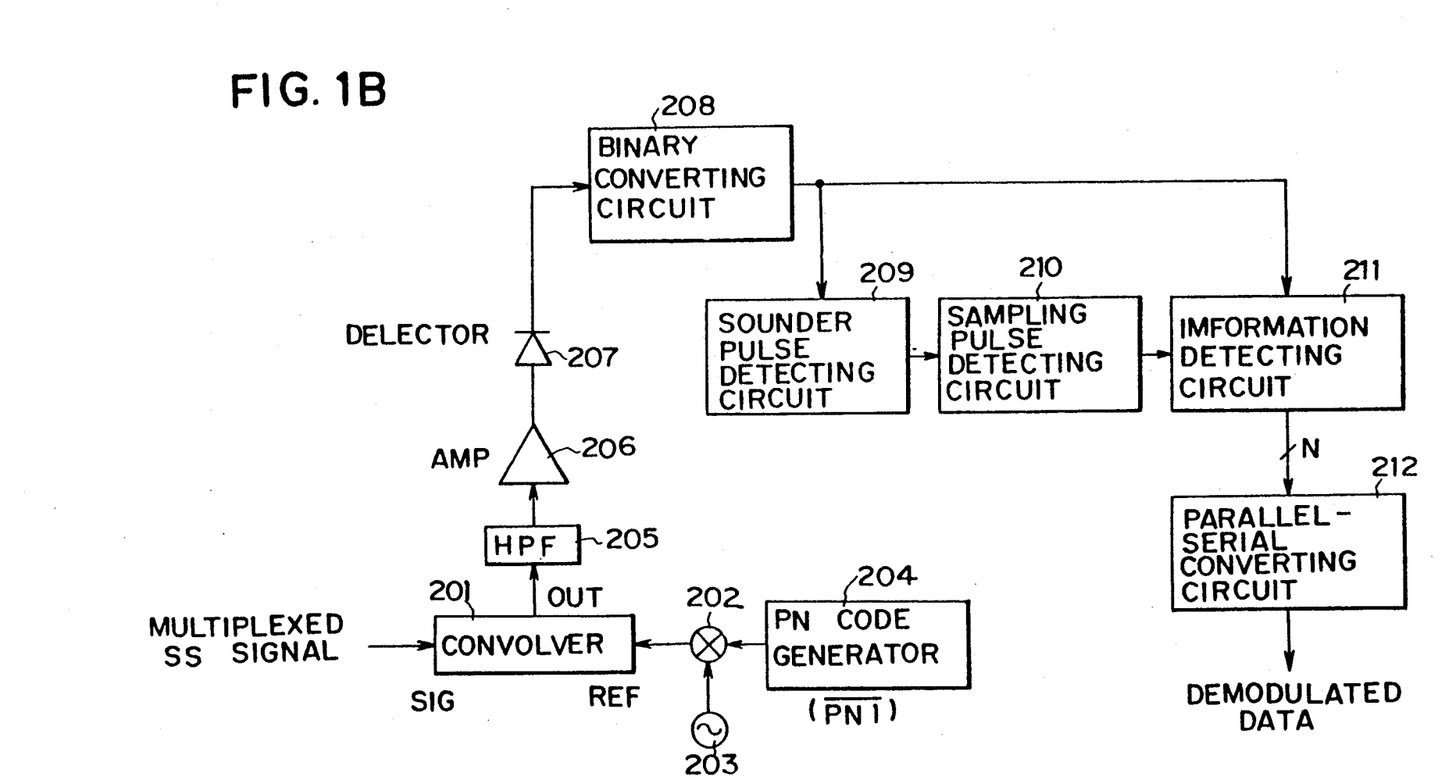
FIG. 1B is a block diagram showing an embodiment of the receiver of the spread spectrum communication device according to the present invention.

Hereinbelow the present invention will be explained, referring to an embodiment indicated in the drawings. FIGS. 1A and 1B indicate the construction of the transmitter and the receiver, respectively, constituting the embodiment of the spread spectrum (SS) communication device according to the present invention.

As indicated in FIG. 1A, the transmitter consists of a serial-parallel converting circuit, a group of selectors 102, a group of delaying circuits 103, an adder 104, a PN code generator 105, an RF carrier generator 106 and a multiplier 107.

As indicated in FIG. 1B, the receiver consists of a convolver 201 serving as a correlator, a multiplier 202, an RF carrier generator 203, a PN code generator 204, a high pass filter (HPF) 205, an amplifier 206, a detector 207, a binary converting circuit 208, a sounder pulse detecting circuit 209, a sampling pulse generating circuit 210, an information detecting circuit 211 and a parallel-serial converting circuit 212.

Now operation of the embodiment described above will be explained. At first, in the transmitter, transmitted data $S_1$ are converted into a plurality of channel signals by the serial-parallel converting circuit 101. Here, in order to simplify the explanation, the number of channels is supposed to be N. Further the transmitted data $S_1$ are converted so that each of the outputs has a lower transmission speed. They are converted into parallel data sets having e.g. a transmission speed, which is 1/N of the transmission speed of the transmitted data $S_1$ or another transmission speed, which is arbitrarily lower than the latter. Spread spectrum modulation (SS modulation) is effected, depending on the polarity of the signal of each of the channels from the serial-parallel converting circuit 101.

The SS modulation described above is effected e.g. according to one of two systems described below.
1. CSK (Code Shift Keying) system, by which one of two sorts of PN codes (PN1 and PN2) is selected, depending to the polarity of the data (signal), to be outputted.
2. OOK (On Off Keying) system, by which it is selected, depending on the polarity of the data (signal), whether a PN code (PN1) should be outputted or not.

Figure 3A:
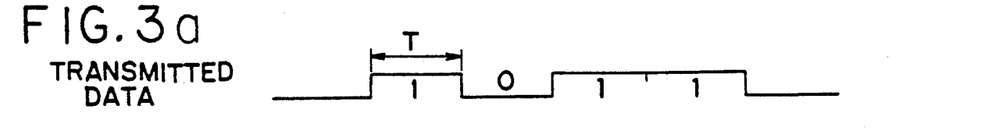
FIGS. 3a–3b are a scheme for explaining the operation of the transmitter.
Figure 3B:
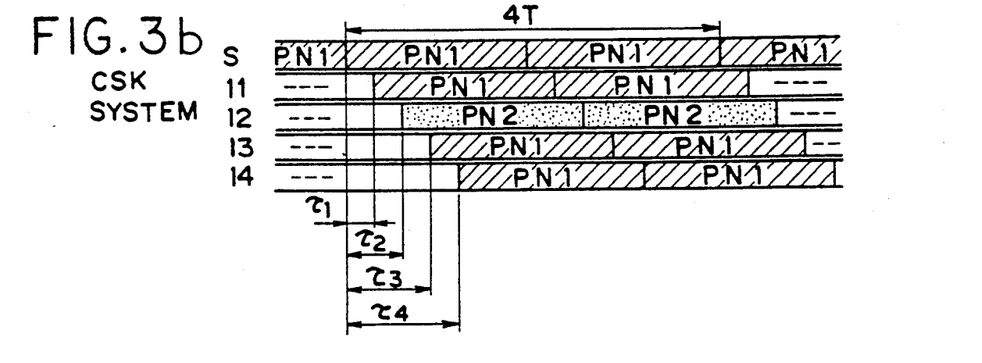
Figure 3C:
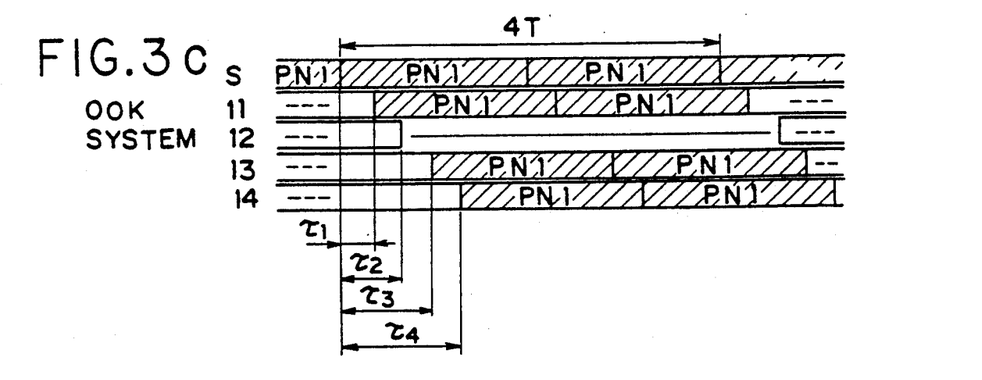

In order to realize the SS modulation operations according to the two systems described above, for generating the PN codes (PN1 and PN2), a spread spectrum modulator is constructed by the PN code generator 105 and a group of the selectors 102 for effecting the selection described above, depending on each of the outputs of the serial-parallel converting circuit 101. Next the output of each of the selectors of the spread spectrum modulator is inputted in each of the delaying circuits composing the group 103. At the outputs of the delaying circuit, SS modulation signals (information channel) are obtained, for which arbitrary delay amounts different from each other are set with reference to the phase of the PN code (here it is supposed to be PN1) in the sounder channel serving as the synchronization signal for data demodulation. This aspect is indicated in FIGS. 3a–3c. In FIGS. 3a–3c, the difference between the CSK system and the OOK system is shown in the different delay amounts ($\tau_1 \sim \tau_4$) in the case where there are four information channels 11 to 14, in which S represents sounder channel. It is indicated also that the transmission speed of the transmitted data is converted into a lower transmission speed for each of the information channel. Here the transmission speed is converted into $\frac{1}{4}$ of the initial speed. The SS modulated signals of the N information channels obtained by the different delaying circuits and the signal of the sounder channel are added in an analogue manner (multiplexing) by the adder 104. The output of the adder 104 is multiplied by the output of the RF carrier generator 106 in the multiplier 107.

Next, in the receiver, the multiplexed SS signal obtained by the transmitter is inputted in one of the input terminals of the convolver 201 as a received signal.

In the other input terminal of the convolver is inputted, as a reference signal, an RF modulated PN code obtained by multiplying the PN code emitted by the PN code generator 204 (here the PN code (PN1), which is in the relation that it is inverted in time with respect to the PN code (PN1) used in the transmitter, is used) by the output of the RF carrier generator 203 in the multiplier 202.

Figure 4:
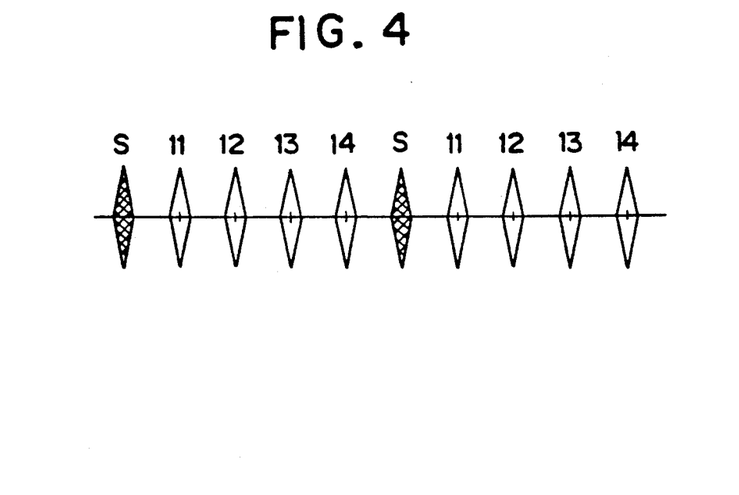
FIG. 4 is a scheme for explaining the operation of the receiver.

In the convolver 201, a correlation operation is effected between the received signal and the reference signal to obtain an RF correlation output (refer to FIG. 4). The gate length (processing time) of the convolver in this explanation corresponds to 2T.

In FIG. 4, correlation peaks separated in time corresponding to the different codes of the information channels, which are in different phase relations, are obtained with reference to the phase of the PN code of the sounder channel explained, referring to FIG. 3.

Here there is shown a state, where correlation peaks representing the self-correlations for the sounder channel and all the information channels are obtained.

Consequently, in the case where no self-correlation is obtained by the CSK system or the OOK system, no correlation peaks are produced (CSK system . . . mutual correlation, OOK system . . . no correlation).

Although in the above embodiment the case, where a convolver is used for the correlator, is described, there are no problems, if a matched filter is used instead thereof.

However the place, where the reference signal is generated, is replaced by a pattern on the matched filter and therefore it is unnecessary.

Then the output of the convolver is detected by the detector 207 through the high pass filter 205 and the amplifier 206 to be converted into a signal in the base band information band, in order to obtain a train of pulses representing logic levels in the binary converting circuit 208.

Further, in the binary converting circuit 208, a threshold value is so set that the correlation peaks and a spurious level can be separated at optimum.

Since the correlation output corresponding to the sounder channel produces always periodical correlation peaks, these correlation peaks are detected by the sounder pulse detecting circuit 209 to obtain a reference time signal.

The purpose of requiring the time signal serving as the reference is to make the spread spectrum code synchronization used in the usual DS-SS system unnecessary.

That is, according to the present invention, the data demodulation is not effected by realizing synchronization between the phase of the PN code in the received signal and the phase of the PN code of the reference signal, but an asynchronous system, in which the mere code synchronization process is omitted, is realized.

Sampling pulses for sampling the correlation outputs corresponding to the different information channels are generated by the sampling pulse generating circuit 210 on the basis of the reference time signal, which is the output of this sounder pulse detecting circuit 209.

In the case where a convolver is used for the correlator, since the received signal inputted in the convolver and the reference signal correspond to each other, the correlation peaks are produced at the gate delay times/2. That is, the correlation outputs corresponding to the delay amounts ($\tau_1 \sim \tau_4$) of the different information channels with reference to the phase of the PN code of the sounder channel on the transmitter side indicated in FIGS. 3a-3c are produced, separated about $\tau_1/2 \sim \tau_4/2$.

Consequently the sampling pulses are generated, taking the above description into account. In this way, a series of data sets of the different information channels are restored by sampling the correlation outputs corresponding to the different information channels in the information detecting circuit 211 on the basis of the sampling pulse.

The data obtained in this case are data having a transmission speed equal to the low transmission speed after the serial-parallel conversion on the transmission side.

Next the transmitted data are restored by converting these N parallel data sets into a serial data set in the parallel-serial converting circuit 212.

Figure 5:
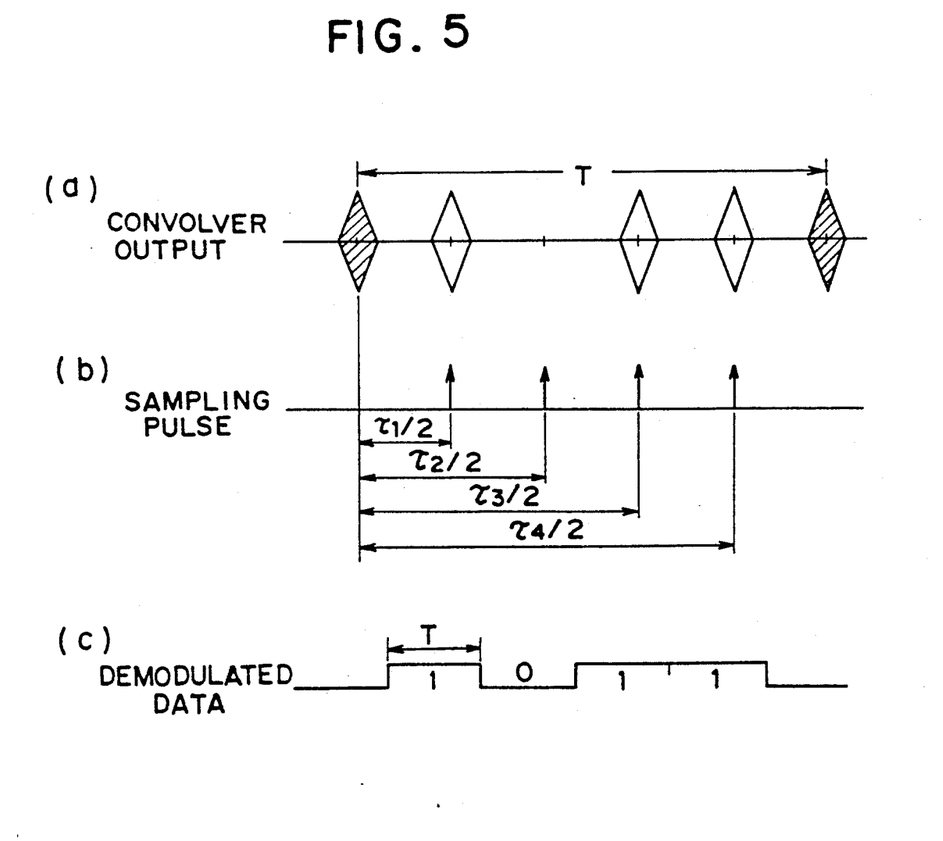
FIG. 5 is another scheme for explaining the operation of the receiver.

The outline of a series of these operations is indicated in FIG. 5.

As explained above, in the receiver, the correlation operation is effected by the correlator. The correlation output is detected and converted into a binary value to obtain a train of correlation pulses representing logic levels. The correlation pulse component corresponding to the sounder channel is detected by the sounder detecting circuit from the correlation pulse train signal. Such detection of the sounder channel serving as the reference signal for the information channels can be said to be an initial synchronization process in its wide meaning. Now a concrete example of the sounder detecting circuit will be explained.

In the transmitter, the PN code of the sounder channel is so set that the correlation output corresponding to the sounder channel is generated always periodically. For example, PN1 described above is set successively. In this way the detection of the sounder is made possible by utilizing the periodicity that the correlation output is generated always periodically.

Figure 8:
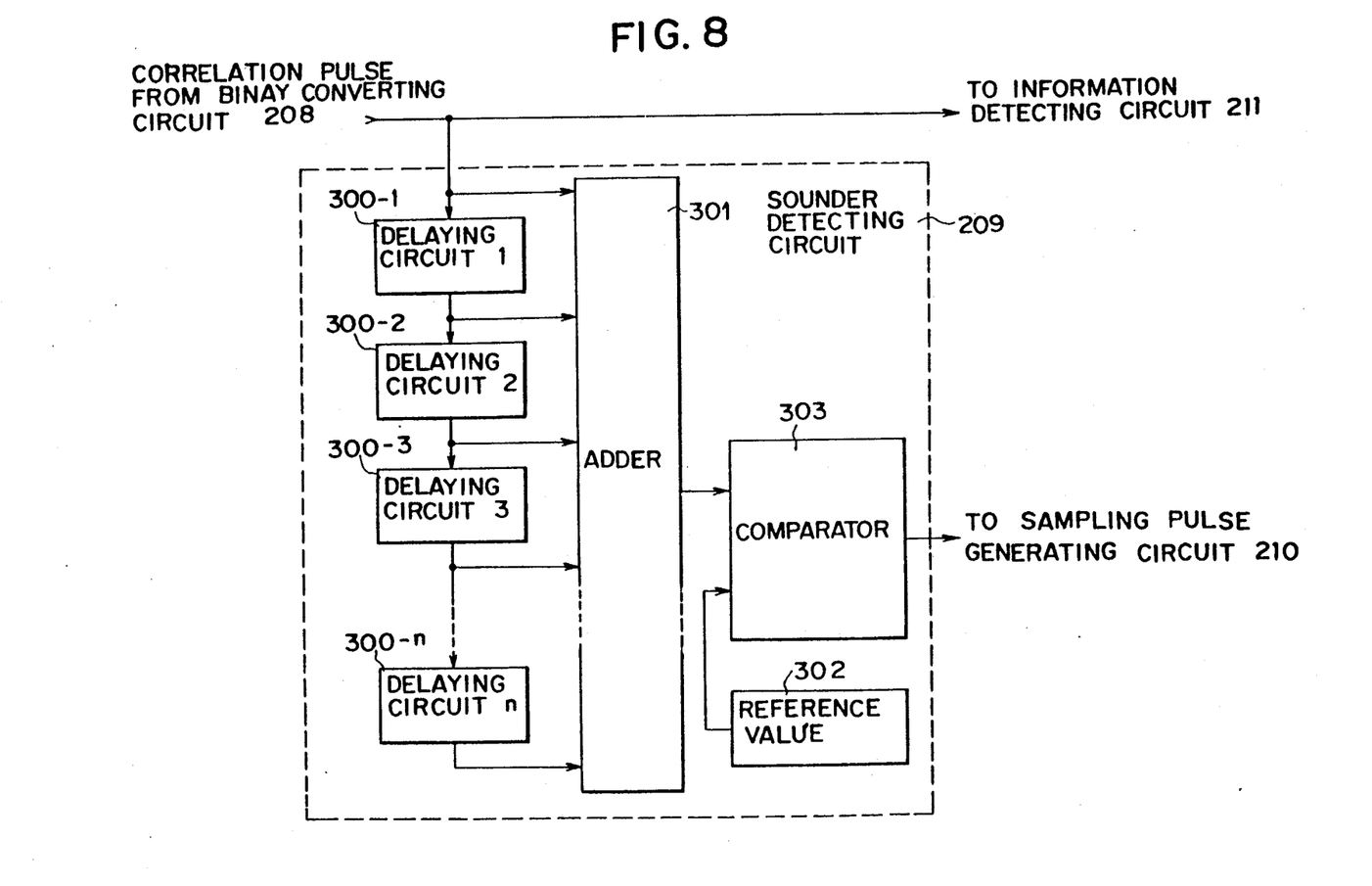
FIG. 8 is a block diagram showing an example of the construction of the sounder detecting circuit.

FIG. 8 shows an example of the construction of the sounder detecting circuit. In the Figure, 300-1 $\sim$ 300-$n$ are delaying circuits; 301 is an adder; 302 is a reference value generating circuit; and 303 is a comparator.

As described above, supposing that the generation period of the correlation pulse component corresponding to the sounder channel is known, the delay time of the different delaying circuit 300-1 $\sim$ 300-$n$ is set at this period. The outputs of the different delaying circuits 300-1 $\sim$ 300-$n$ are added by the adder 301 in an analogue manner. In this way the number pulses at that time is obtained for every generation period of the correlation pulse component. For example, when there are four delaying circuits, the greatest number of pulses, which can be detected, is 5.

The output of the adder 301 is compared with the reference value from the reference value generating circuit 302 by the comparator 303. When they are in accordance with each other, an output signal is obtained from the comparator 303. In the case where this signal is obtained, it is judged that a signal having the periodicity has been inputted, that is, a sounder pulse has been detected. Further, although the signal judgment precision can be increased by increasing the number of stages of the delaying circuits described above, the number of stages is suitably chosen, taking the scale of circuits or the utilization environment thereof into account.

The output signal of the comparator 303 described above is sent to the sampling pulse generating circuit, as described previously. The correlation pulses corresponding to the different information channels are sampled by using sampling pulses obtained by the circuit stated above to reproduce the information.

At the sounder detection described previously, in the case where the transmitted data are data consisting of successive 1s, when the multiplexed SS signal is produced in the transmitter, i.e. in the case where the multiplexed SS signal is obtained to be outputted in the form of PN1s successively outputted at the SS modulation, the correlation pulses corresponding to the different information channels are produced successively periodically at the output of the correlator, similarly to the sounder channel. In this case, it is possible that the sounder pulse detecting circuit passes a detection judgment both for the correlation pulse corresponding to the sounder pulse and for the correlation pulses corresponding to the information channels.

As the result, in the case where the sounder pulse cannot be detected for either one of the information channel, no correlation pulse corresponding to the information channel is sampled and erroneous data are reproduced.

In order to solve this problem, there are two methods (A) and (B).

Figure 9A:
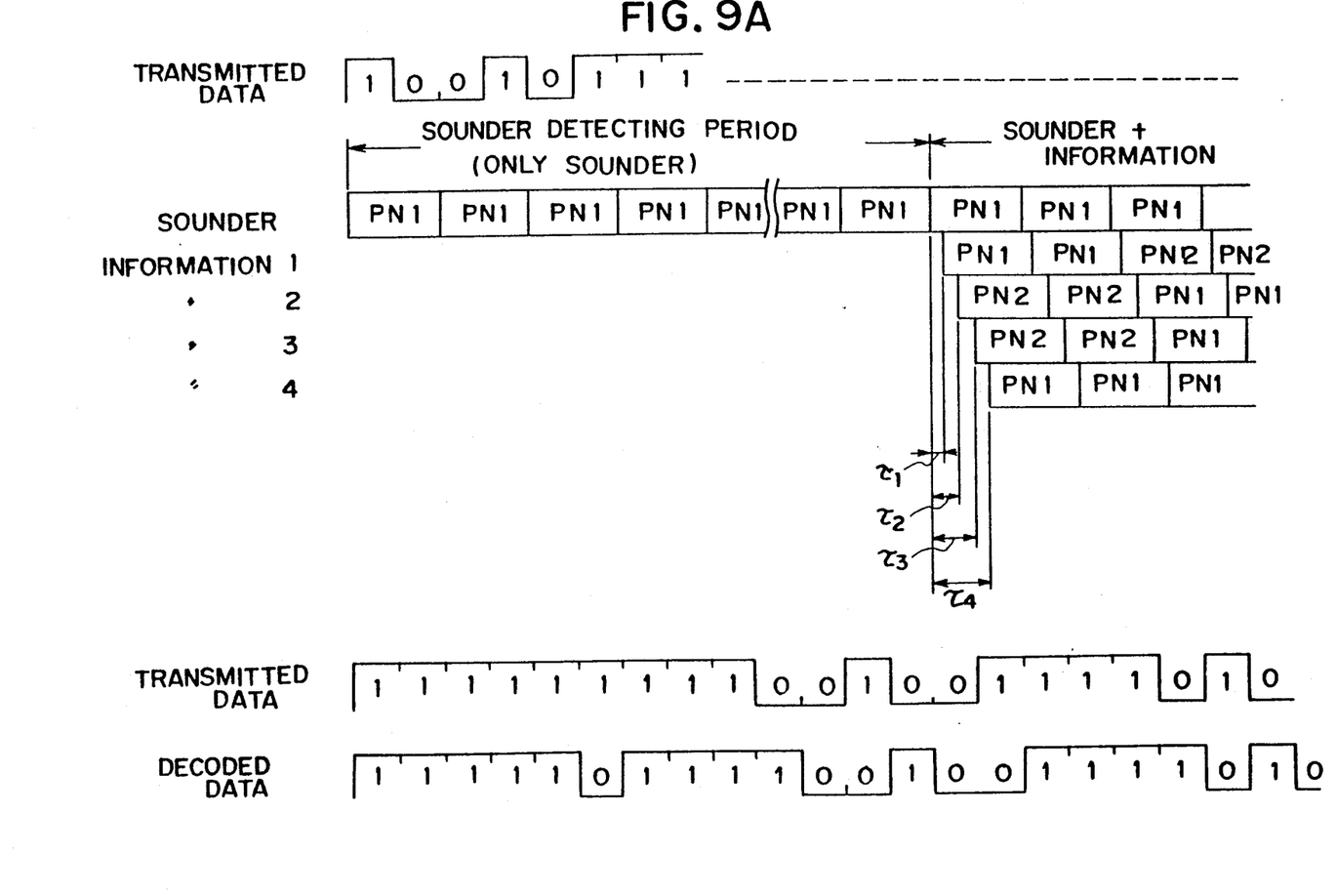
FIG. 9A is a scheme for explaining an example of a sure data sampling method.

(A) When data, which are to be transmitted, are generated, only the sounder channel is outputted, as indicated in FIG. 9A, before the transmitted data are multiplexed to output a multiplexed SS signal. The transmission period is sufficient only for detecting the correlation pulse component corresponding to the sounder channel by means of the sounder detecting circuit.

Figure 10:
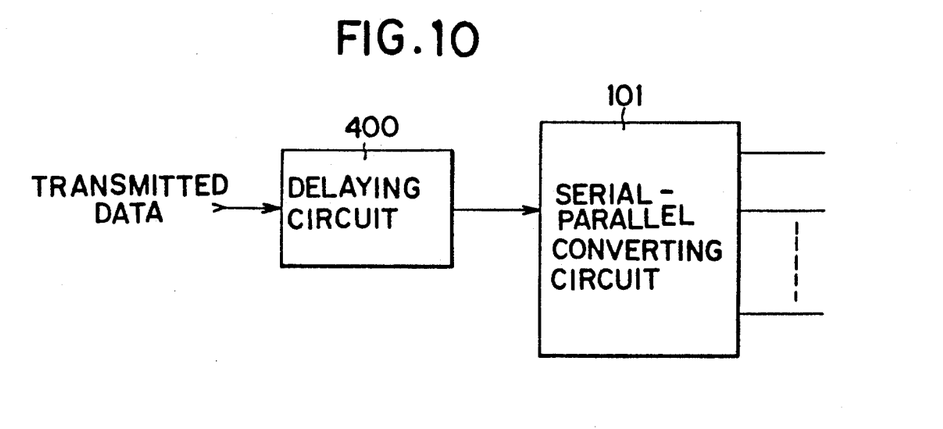
FIG. 10 is a block diagram showing an example of the construction of the transmitter for realizing this method.

In this case, when there is no handshake of high grade between the side where the data are inputted in the transmitter; i.e. the side, where the data to be transmitted are generated (e.g. a personal computer for communication between personal computers, etc.), and the transmitter, a delaying circuit 400 is disposed before the serial-parallel converting circuit 101, as indicated in FIG. 10, so that the data (information), which are to be transmitted, are delayed from the start of the generation by the transmission period.

Figure 9B:
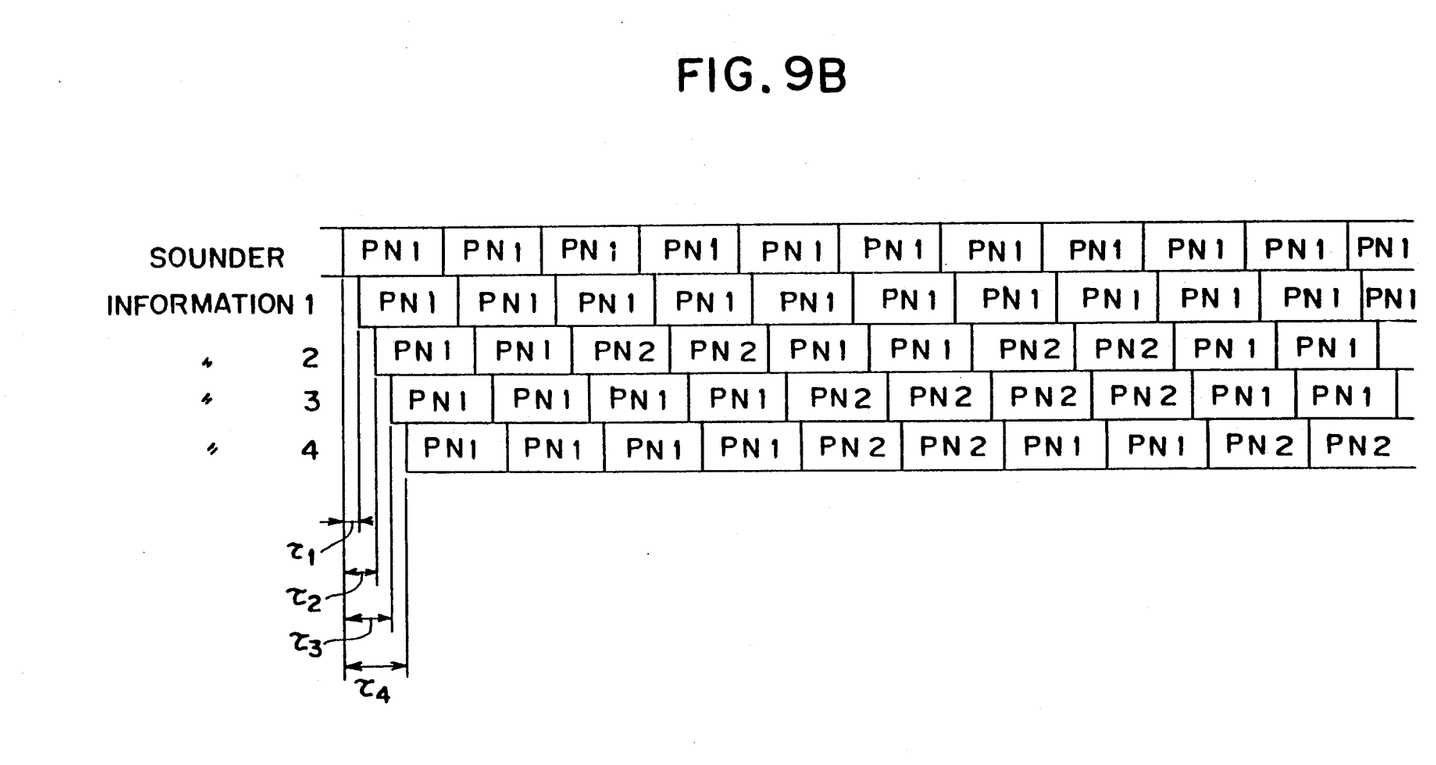
FIG. 9B is a scheme for explaining another example of the sure data sample method.

(B) When data (information), which are to be transmitted, are generated, in the transmitter, the data to be transmitted are coded and multiplexed to output a multiplexed SS signal, as indicated in FIG. 9B. For this coding method, there are known a method, by which 0s are inserted here and there according to a predetermined algorithm in the transmitted data, where 1s succeed, etc., in order that the correlation pulse corresponding to the sounder channel can be surely detected by the sounder detecting circuit. In this way, since 1s succeed not always, no erroneous detection takes place in the sounder detecting circuit.

Figure 11A:
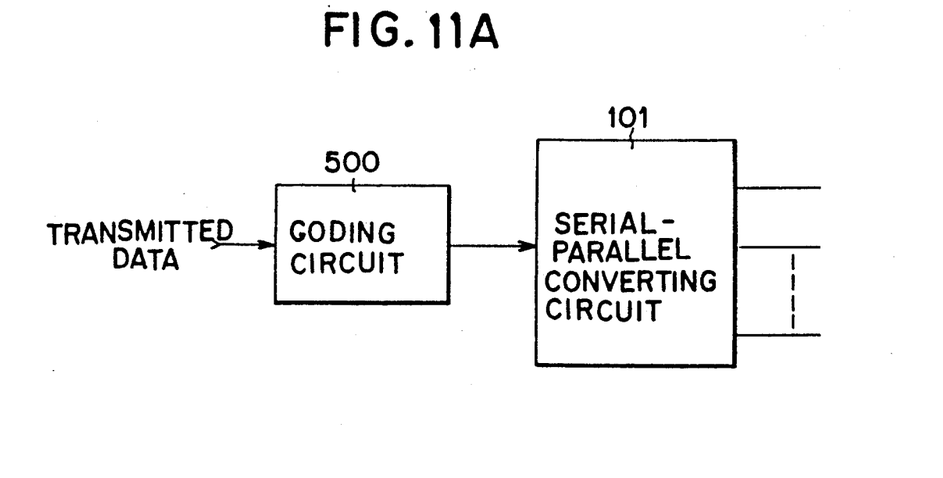
FIG. 11A is a block diagram showing another example of the construction of the transmitter for realizing this method.
Figure 11B:
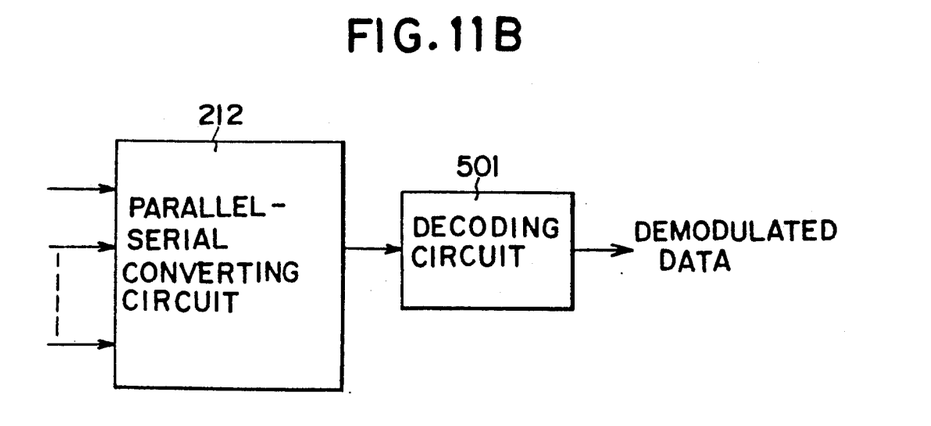
FIG. 11B is a block diagram showing the other example of the construction of the receiver for realizing this method.

Further, in the data demodulation by the receiver, the transmitted data are decoded, before they are reproduced to be outputted. That is, coded transmitted data are restored by removing inserted 0s according to the predetermined algorithm, contrarily to the processing on the transmitter side. An example of the construction of the transmitter and the receiver in this case is indicated in FIGS. 11A and 11B, respectively.

In these Figures, 500 is a coding circuit and 501 is a decoding circuit. The other construction is identical to that indicated in FIGS. 1A and 1B.

The sounder detection described above makes the spread spectrum code synchronization by the DS-SS system unnecessary. That is, it is for realizing an asynchronous system. Consequently, in this case, the correlation peaks should be surely outputted and for this reason the information channels should be longer than the gate length of the convolver. That is, the gate length (processing time) of the convolver corresponds to 2T (T being the transmitted data transmission speed). Consequently it is preferable to convert the different information channel into a transmission speed, which is lower than a twice of the transmission speed (e.g. ¼) of the transmitted data. In this way a plurality of (e.g. 4) correlation peaks are produced from the convolver for 1 bit of the different information channels. However, in reality, since the level of the correlation peak at a point of change of the data is unstable, in the case as described above, it is necessary to detect a sure correlation peak point in the 1 bit length of the information channel data.

For the detection of such a sure correlation peak point, a method may be adopted, by which the point of change of data is recognized to avoid it. That is, when the data are "0", at the points of change of data before and after it, although no correlation outputs are generated, some level is produced. Consequently, when data, which are to be transmitted, are produced arbitrary dummy data having a length equal to the information channel length and a point of change of data for making it possible to detect the optimum point are transmitted therefore. Since these dummy data are serial-parallel-converted similarly to the usual data, the dummy data are made pass through either one of the information channels of the multiplexed SS signal finally obtained and in the receiver only this channel is regarded and detected.

In this case, the dummy data should be transmitted before the transmitted data, paying attention to the multiplex number so that e.g. an alternate pattern of 1, 0, 1, 0, 1, 0, . . . , etc. are produced for one information channel.

Figure 2A:
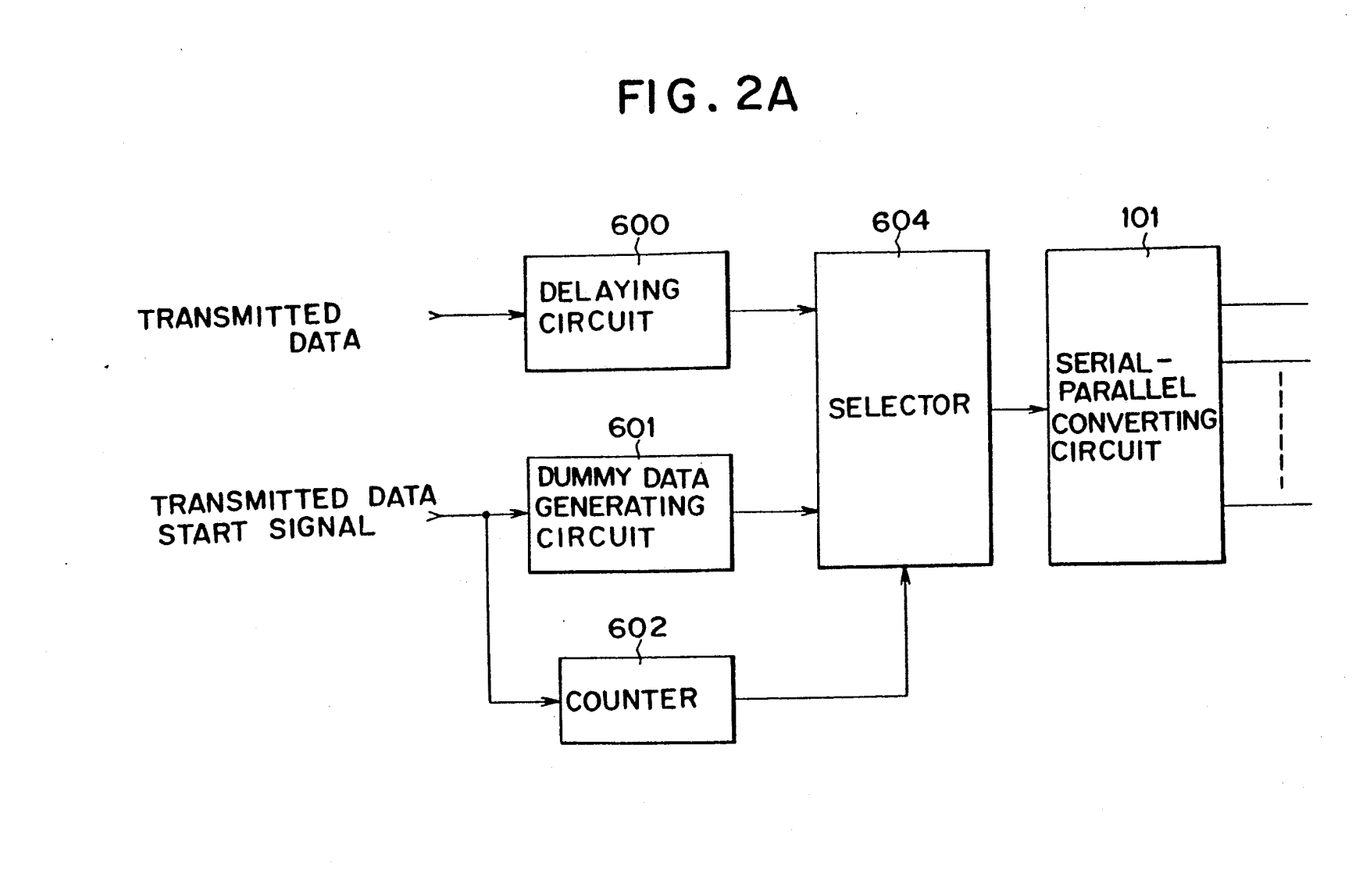
FIG. 2A is a block diagram showing another embodiment of the transmitter thereof.
Figure 2B:
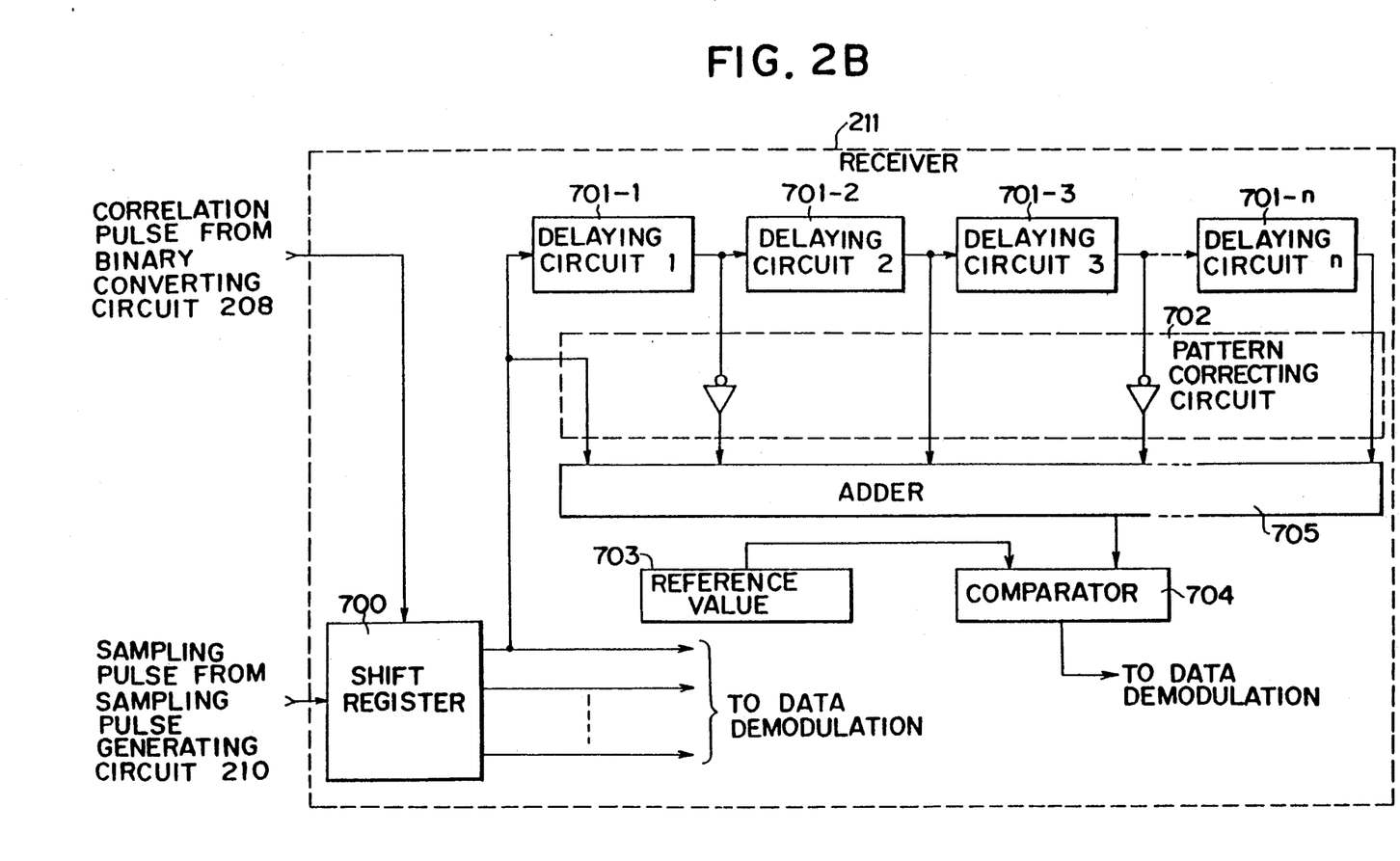
FIG. 2B is a block diagram showing the other embodiment of the receiver thereof.

FIGS. 2A and 2B show an example of the construction of the transmitter and the receiver, respectively, in the case where the method for detecting the correlation peak point described above is adopted.

In FIG. 2A, 600 is a delaying circuit; 601 is a dummy data generating circuit; 602 is a counter (or delaying circuit) for a time equivalent to the delaying circuit described above and 604 is a selector. The construction after this selector is identical to that indicated in FIG. 1A or to the construction, in which the circuit indicated in FIG. 10 or FIG. 11A is added thereto.

FIG. 2B indicates an example of the construction of the information detecting circuit 211 in the receiver. In the Figure, 700 is a shift resister; 701-1, 701-2, 701-3, . . . , 701-n are delaying circuit; 702 is a pattern correcting circuit; 703 is a reference value generating circuit; 704 is a comparator; and 705 is an adder. The pattern correcting circuit 702 includes e.g. inverters INV1 and INV2.

In the transmitter indicated in FIG. 2A, in the case where the number of multiplex of information is e.g. 4, dummy data of 1000000010000000 generated by the dummy data generating circuit 601 are inputted before the transmitted data by means of the selector 604, responding to a transmitted data start signal to obtain the multiplexed SS signal through an SS modulator, etc. after the serial-parallel conversion. No problem takes place, because during the dummy data transmission period, the serial transmitted data, which are to be transmitted, are delayed by the delaying circuit 600 by a period identical thereto. After the lapse of this period, the dummy data are switched over to the transmitted data by the selector 604, responding to the output of the counter 602.

In the receiver indicated in FIG. 2B, the correlation pulses from the binary converting circuit 208 are sampled by sampling pulses in the shift register 700. The correlation pulses corresponding to the different information channels are inputted in the delaying circuit 701-1, 701-2, . . . , 701-n. Here the delay time of the different delaying circuits is set so as to be equal to the information channel length.

The outputs of the different delaying circuits are added in an analogue manner by the adder 705 through the pattern correcting circuit 702. In the pattern correcting circuit 702, since e.g. an alternate pattern of 101010 . . . is obtained, an inverter INV1, INV2 is disposed for every two delaying circuits. In this way, at a suitable point, the pattern of 101010 . . . is converted into a homopolar pattern of 111111 . . . The point of time, where the final comparison output is obtained by the comparator 704 with respect to the reference value, is the optimum point for the data, i.e. the most suitable point for the data demodulation by sampling.

Any dummy pattern may be used. Inverters in the pattern correcting circuit in the receiver are disposed, corresponding to the dummy pattern. However the dummy pattern length should be longer than the longest delay time in the group of delaying circuits 701, i.e. it should be sufficiently long for detecting it.

As explained above, according to the present invention, only one correlator is used for effecting multiplexed spread spectrum communication and thus it is possible to simplify the circuit.

In the case where a convolver or a matched filter is used for the correlator, the upper limit of the transmission rate of the data, which can be dealt with, is determined by the processing time of the correlator. However, according to the present invention, it is possible to effect high speed data transmission, exceeding this limit.

Since it is not necessary to raise the clock of the PN code, even when high speed data transmission is effected, frequency band for the communication is not necessarily widened and there are no interferences with other communication systems.

Further, since a spread spectrum modulated signal independent of the data is multiplex-modulated as a reference time signal, the phase synchronization of the PN code in the correlator is not necessary and therefore it is possible to transmit data at a high speed without paying attention to processing relaxation of the correlator. Furthermore, since the correlation pulse corresponding to the sounder channel serving as the reference at the data demodulation can be surely detected and at the same time the sure data sampling point can be detected, data demodulation power is increased.

What is claimed is:

1. A spread spectrum communication device comprising:
   a transmitter having:
   serial-parallel converting means for converting serial data to be transmitted into a plurality of parallel data sets;
   spread spectrum modulating means for effecting spread spectrum modulation by modulating each of said data sets by a sounder spread spectrum code to generate a respective spread spectrum signal;
   delaying means for delaying each of said spread spectrum signals from said spread spectrum modulating means by a respective different delay interval with reference to the phase of said sounder spread spectrum code, said sounder spread spectrum signal being independent of said plurality of parallel data sets;
   adding means for adding each of the delayed spread spectrum signals from said delaying means to said sounder spread spectrum code; and
   an RF modulator for RF modulating an output of said adding means; and
   a receiver having:
   a correlator for correlating a received signal from said transmitter with a reference signal;
   converting means for converting an output signal of said correlator into a signal in a base band information band;
   a binary converting circuit for converting said signal in said base band information band into a digital signal; and
   data demodulating means for demodulating said digital signal to restore the serial data.

2. A spread spectrum communication device according to claim 1, wherein said spread spectrum modulating means generates each of said spread spectrum signals by respectively outputting one of said sounder spread spectrum code and a different spread spectrum code when a corresponding one of said data sets respectively has first and second logical states.

3. A spread spectrum communication device according to claim 1, wherein said spread spectrum modulating means generates each of said spread spectrum signals by respectively outputting one of said sounder spread spectrum code and a predetermined constant value when a corresponding one of said data sets respectively has first and second logical states.

4. A spread spectrum communication device according to claim 1, wherein said data demodulating means includes detecting means for detecting a correlation peak in the output signal received by said data demodulating means through said binary converting circuit from said correlator and corresponding to said sounder spread spectrum code.

5. A spread spectrum communication device according to claim 1, wherein said data demodulating means includes sampling pulse generating means for pulse sampling a correlation peak in the output signal received by said data demodulating means through said binary converting circuit from said correlator and corresponding to said plurality of parallel data sets.

6. A spread spectrum communication device according to claim 5, wherein said data demodulating means includes information detecting means for sampling a correlation peak in the output signal from said correlator corresponding to said plurality of parallel data sets in response to a sampling pulse generated by said sampling pulse generating means so as to recreate said plurality of parallel data sets, and a parallel-serial converting means for demodulating said plurality of parallel data sets output by said information detecting means to obtain the serial data.

7. A spread spectrum communication device according to claim 1, wherein said transmitter includes further delaying means for delaying said serial data by a predetermined period of time before converting said data into said plurality of parallel data sets.

8. A spread spectrum communication device according to claim 1, wherein said transmitter includes coding means for coding said serial data according to a predetermined algorithm before converting said serial data into said plurality of parallel data sets; and wherein said receiver includes decoding means for restoring said serial data by decoding data restored by said data demodulating means.

9. A spread spectrum communication device according to claim 1, wherein said transmitter includes means for supplying arbitrary dummy data to said serial-parallel converting means before supplying said serial data thereto; and wherein said receiver includes dummy data detecting means for detecting said dummy data from said digital signal from said binary converting circuit.

10. A spread spectrum communication device according to claim 9, wherein said dummy data detecting means includes a plurality of delaying circuits which each delay a respective correlation pulse in said digital signal corresponding to a respective said data set; pattern correcting means for correcting the output of each of said delaying circuits; an adder for adding outputs of said pattern correcting means in an analog manner; and a comparator for comparing an output of said adder with a reference value.

11. A spread spectrum communication device comprising:
a transmitter having:
serial-parallel converting means for converting serial data to be transmitted into a plurality of parallel data sets;
spread spectrum modulating for effecting spread-spectrum modulation by using each of said data sets to generate a respective spread spectrum signal; and
means for outputting a multiplexed spread spectrum signal by combining each said spread spectrum signal from said spread spectrum modulating means with a spread spectrum code which doesn't depend on said plurality of parallel data sets; and
a receiver having:
a correlator for correlating a received signal from said transmitter with a reference signal;
means for generating a correlation pulse signal by periodically converting an output signal of said correlator into a base band signal in a base band information band and then converting said base band signal into a binary value;
detecting means for detecting from said correlation pulse signal a correlation pulse component corresponding to said spread spectrum code which doesn't depend on said data sets; and
means for restoring said serial data from said correlation pulse signal in response to said correlation pulse component.

12. A spread spectrum communication device according to claim 11, wherein said detecting means includes a plurality of delaying circuits each producing an output which is said correlation pulse signal delayed by a respective different time interval; an adder for adding the outputs of said delaying circuits in an analog manner; and a comparator for comparing an output of said adder with a reference value, said comparator producing at an output thereof said correlation pulse component.

13. A spread spectrum communication device according to claim 11, wherein said transmitter includes delaying means for delaying said serial data by a predetermined period of time before converting said data into said plurality of parallel data sets.

14. A spread spectrum communication device according to claim 11, wherein said transmitter includes coding means for coding said serial data according to a predetermined algorithm before converting said serial data into said plurality of parallel data sets; and wherein said receiver includes decoding means for restoring said serial data by decoding data restored by said means for restoring.

15. A spread spectrum communication device according to claim 11, wherein said transmitter includes means for supplying arbitrary dummy data to said serial-parallel converting means before supplying said serial data thereto, and means for outputting selectively said data and said dummy data; and wherein said receiver includes dummy data detecting means for detecting said dummy data from said correlation pulse signal.

* * * * *